(12) United States Patent  
Ko

(10) Patent No.: US 8,744,662 B2
(45) Date of Patent: Jun. 3, 2014

(54) METHOD FOR OPERATING AUTONOMOUS MOVING CLEANING APPARATUS

(76) Inventor: Joseph Y. Ko, Irvine, CA (US)

(*) Notice: Subject to any disclaimer, the term of this patent is extended or adjusted under 35 U.S.C. 154(b) by 32 days.

(21) Appl. No.: 13/465,313

(22) Filed: May 7, 2012

(65) Prior Publication Data

US 2013/0297139 A1 Nov. 7, 2013

(51) Int. Cl.
  *G01C 22/00* (2006.01)
  *G05D 1/00* (2006.01)
(52) U.S. Cl.
  USPC ............................................. 701/23; 701/26
(58) Field of Classification Search
  USPC ................................... 701/23, 26; 15/3
  See application file for complete search history.

(56) References Cited

U.S. PATENT DOCUMENTS

| | | | |
|---|---|---|---|
| 6,594,844 B2 | 7/2003 | Jones | |
| 6,883,201 B2 | 4/2005 | Jones et al. | |
| 7,218,993 B2 * | 5/2007 | Yasukawa et al. | 700/245 |
| 7,613,544 B2 * | 11/2009 | Park et al. | 700/245 |
| 7,805,220 B2 * | 9/2010 | Taylor et al. | 700/253 |
| 2003/0137268 A1 * | 7/2003 | Papanikolopoulos et al. | 318/568.11 |
| 2005/0204505 A1 * | 9/2005 | Kashiwagi | 15/319 |
| 2007/0100500 A1 * | 5/2007 | Abramson et al. | 700/245 |
| 2007/0250212 A1 * | 10/2007 | Halloran et al. | 700/245 |
| 2010/0115716 A1 * | 5/2010 | Landry et al. | 15/3 |
| 2011/0004342 A1 * | 1/2011 | Knopow et al. | 700/253 |
| 2012/0215380 A1 * | 8/2012 | Fouillade et al. | 701/2 |
| 2012/0259465 A1 * | 10/2012 | Chen et al. | 700/259 |
| 2012/0313779 A1 * | 12/2012 | Papaefstathiou et al. | 340/540 |
| 2013/0098402 A1 * | 4/2013 | Yoon et al. | 134/18 |
| 2013/0138247 A1 * | 5/2013 | Gutmann et al. | 700/253 |

* cited by examiner

*Primary Examiner* — Fadey Jabr
*Assistant Examiner* — Paula L Schneider
(74) *Attorney, Agent, or Firm* — Muncy, Geissler, Olds & Lowe, P.C.

(57) ABSTRACT

A method for operating an autonomous moving cleaning apparatus includes the steps of: a microcontroller unit (MCU) processes a digital signal through an encoding technique to form an encrypted encoding data set; the MCU continuously sends out the encrypted encoding data set; data values in the encrypted encoding data set are converted to high or low voltages to activate a light emission member to generate flicker light; a light receiving member continuously receives a string of reflective light corresponding to the flicker light to form a corresponding high or low voltage which is converted to a corresponding digital signal sent to the MCU to be compared with the encrypted coding data set for decoding; and the MCU controls operations of a servomotor based on decoding correctness and the detected corresponding digital signal. Thus the autonomous moving cleaning apparatus can function steadily without being interfered by external lights.

21 Claims, 4 Drawing Sheets

Fig. 1

METHOD FOR OPERATING AUTONOMOUS MOVING CLEANING APPARATUS

FIELD OF THE INVENTION

The present invention relates to an autonomous moving cleaning apparatus and particularly to a method for operating autonomous floor sweeping machines, vacuum cleaners or floor moping apparatus.

BACKGROUND OF THE INVENTION

U.S. Pat. No. 6,883,201 entitled: "Autonomous floor-cleaning robot" and U.S. Pat. No. 6,594,844 entitled: "Coverage robot mobility" disclose two types of autonomous moving floor cleaning apparatus such as floor sweeping machines, vacuum cleaners or floor moping apparatus. They have a plurality of sensors located at the lower side, front side or periphery to prevent strong impact when encounter obstacles, or falling to a descending staircase and resulting in damage occurred to the floor sweeping machines, vacuum cleaners or floor moping apparatus. To avoid those apparatus from impact or falling down they have to rely on the sensors to provide correct information so that they can move forwards, decelerate, move backwards or stop moving.

However, in the aforesaid conventional techniques malfunctions often occur to the floor sweeping machines, vacuum cleaners or floor moping apparatus. This mainly causes by too many types of lights presented in the external environments they are operating. Hence when the sensors receive those lights they cannot correctly judge and interpret, and result in abnormal forward, deceleration, backward or stop. This also makes their lifespan shorter. This becomes the biggest problem of the conventional products pending to be resolved.

SUMMARY OF THE INVENTION

The primary object of the present invention is to overcome the aforesaid disadvantages of the conventional techniques by providing a method to enable an autonomous moving cleaning apparatus to function steadily without being interfered by external lights.

To achieve the foregoing object the present invention provides a method for operating an autonomous moving cleaning apparatus. The autonomous moving cleaning apparatus includes at least a battery to provide operation of the cleaning apparatus, a driving wheel to drive moving of the cleaning apparatus, a floor sweeping roller to clear dirt on the floor, at least one servomotor to drive the driving wheel and floor sweeping roller, a microcontroller unit (MCU in short hereinafter) to control spinning of the servomotor, a light emission member activated by a voltage sent by the MCU and converted, a light receiving member to receive light from the light emission member and convert the light to send to operate the MCU, and a function key to select preset functions provided by the MCU to control the servomotor. The method according to the invention includes the steps of: the MCU provides a digital signal which is processed through an encoding technique to form an encrypted encoding data set; the MCU continuously sends out the encrypted encoding data set; data values in the encrypted encoding data set are converted to high or low voltages to activate the light emission member to generate flicker light; the light receiving member continuously receives a string of reflective light corresponding to the flicker light generated by the light emission member to form a corresponding high or low voltage which is converted to form a corresponding digital signal sent to the MCU to be compared with the encrypted coding data set for decoding; and the MCU controls the servomotor to spin forwards, decelerate, spin backwards or stop based on decoding correctness and the detected corresponding digital signal in a condition of strong, weak, presence or absence.

To achieve the foregoing object the present invention provides a method for operating an autonomous moving cleaning apparatus. The autonomous moving cleaning apparatus includes at least a battery to support operation of the cleaning apparatus, a driving wheel to drive moving of the cleaning apparatus, a dust suction fan motor to clear dirt on the floor, at least one servomotor to drive the driving wheel, a MCU to control spinning of the servomotor, a light emission member activated by a voltage sent and converted by the MCU, a light receiving member to receive light from the light emission member and convert the light to send to operate the MCU, and a function key to select preset functions provided by the MCU to control the dust suction fan motor and servomotor. The method according to the invention includes the steps of: the MCU provides a digital signal which is processed through an encoding technique to form an encrypted encoding data set; the MCU continuously sends out the encrypted encoding data set; data values in the encrypted encoding data set are converted to high or low voltages to activate the light emission member to generate flicker light; the light receiving member continuously receives a string of reflective light corresponding to the flicker light generated by the light emission member to form a corresponding high or low voltage which is converted to form a corresponding digital signal sent to the MCU to be compared with the encrypted coding data set for decoding; and the MCU controls the servomotor to spin forwards, decelerate, spin backwards or stop based on decoding correctness and the detected corresponding digital signal in a condition of strong, weak, presence or absence.

To achieve the foregoing object the present invention provides a method for operating an autonomous moving cleaning apparatus. The autonomous moving cleaning apparatus includes at least a battery to support operation of the cleaning apparatus, a driving wheel to drive moving of the cleaning apparatus, at least one servomotor to drive the driving wheel, a MCU to control spinning of the servomotor, a light emission member activated by a voltage sent and converted by the MCU, a light receiving member to receive light from the light emission member and convert the light to send to operate the MCU, and a function key to select preset functions provided by the MCU to control the servomotor. The method according to the invention includes the steps of: the MCU provides a digital signal which is processed through an encoding technique to form an encrypted encoding data set; the MCU continuously sends out the encrypted encoding data set; data values in the encrypted encoding data set are converted to high or low voltages to activate the light emission member to generate flicker light; the light receiving member continuously receives a string of reflective light corresponding to the flicker light generated by the light emission member to form a corresponding high or low voltage which is converted to form a corresponding digital signal sent to the MCU to be compared with the encrypted coding data set for decoding; and the MCU controls the servomotor to spin forwards, decelerate, spin backwards or stop based on decoding correctness and the detected corresponding digital signal in a condition of strong, weak, presence or absence.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 1 is a schematic graphic showing consecutive digital signals of an encrypted encoding data set.

DETAILED DESCRIPTION OF THE PREFERRED EMBODIMENTS

Figure 1:
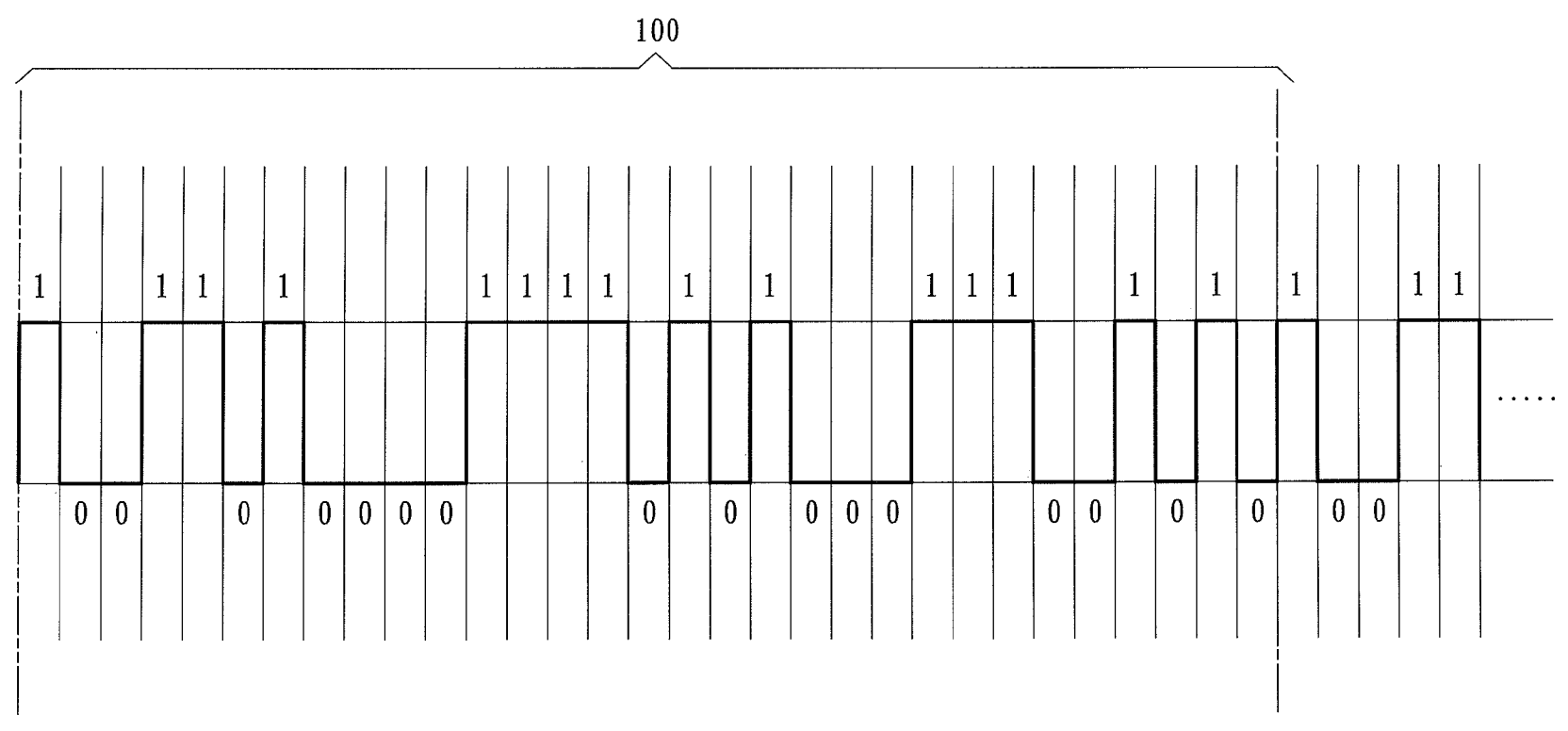
Figure 2:
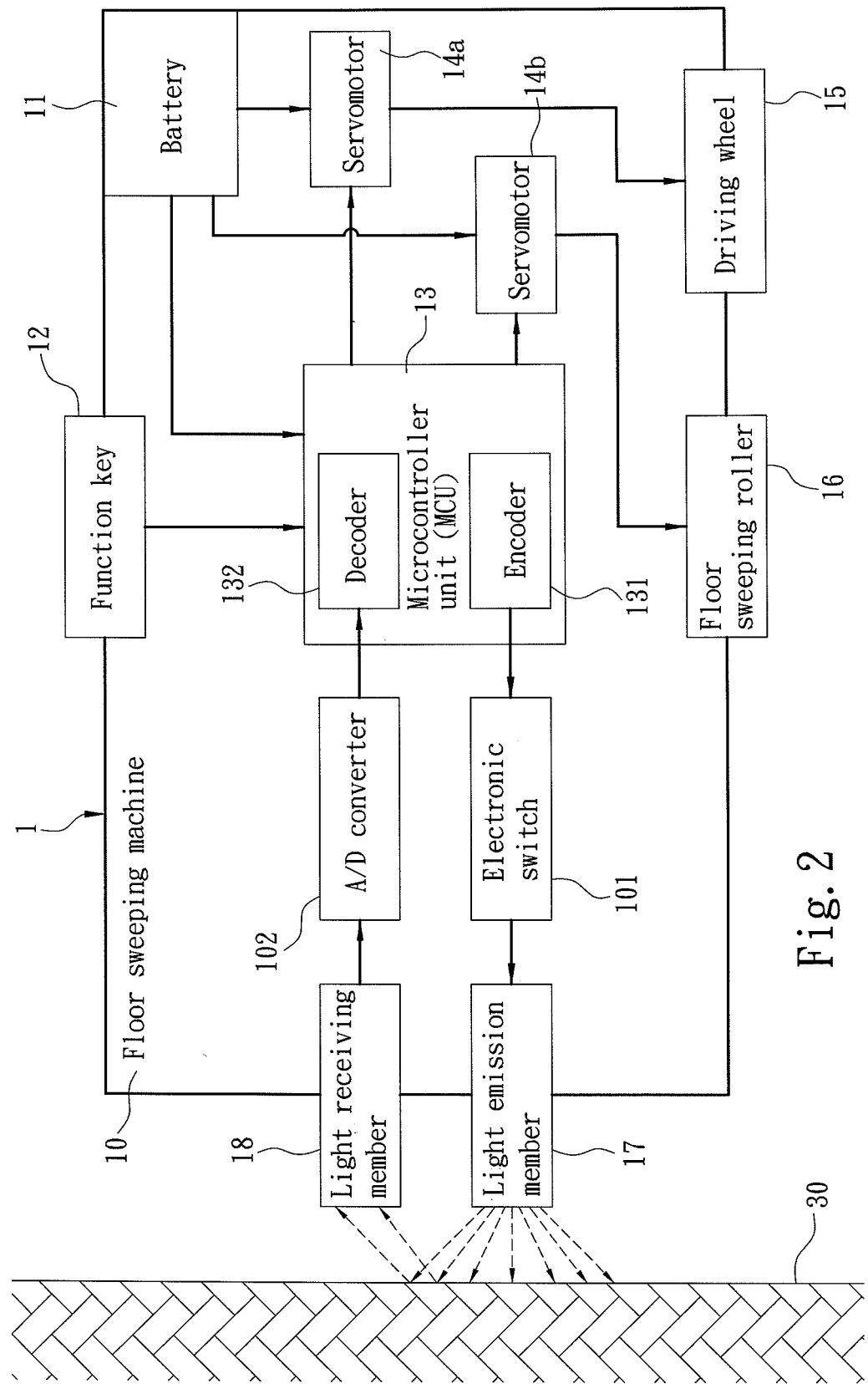
FIG. 2 is a schematic block diagram of the structure of a first embodiment of the invention.

Please refer to FIG. 2 for a first embodiment of the method of the invention adopted for use on an autonomous moving cleaning apparatus 1. The autonomous moving cleaning apparatus 1 includes at least a battery 11 to support operation of the cleaning apparatus 1, a driving wheel 15 to drive moving of the cleaning apparatus 1, a floor sweeping roller 16 to clear dirt on the floor, at least one servomotor 14a and 14b to drive the driving wheel 15 and floor sweeping roller 16, a MCU 13 to control spinning of the servomotors 14a and 14b, a light emission member 17 (such as a LED tube) activated by a voltage sent and converted by the MCU 13, a light receiving member 18 to receive light emitted from the light emission member 17 and convert the light to send to operate the MCU 13, and a function key 12 to select preset functions provided by the MCU 13 to control the servomotors 14a and 14b. The MCU 13 further includes an encoder 131 to form an encrypted encoding data set 100 and a decoder 132 to compare with the encrypted encoding data set 100 for decoding. The autonomous moving cleaning apparatus 1 also can include an electronic switch 101 (such as a triode or MOS tube) controlled by the data values in the encrypted encoding data set 100 and an analog-to-digital (A/D) converter 102 to convert the voltage corresponding to the light received by the light receiving member 18 to the corresponding digital signal. The method according to the invention includes the steps of: the MCU 13 provides a digital signal which is processed through an encoding technique to form an encrypted encoding data set 100, such as via Manchester encoding technique to transform the continuous digital signal to another type of continuous digital signals in the encrypted encoding data set 100 like "1001101000011110101000111001010", also referring to FIG. 1; the MCU 13 continuously sends out the encrypted encoding data set 100; the data values in the encrypted encoding data set 100 are converted to high or low voltages via the electronic switch 101 to activate the light emission member 17 to generate flicker light; the light receiving member 18 continuously receives a string of reflective light from an obstacle 30 corresponding to the flicker light generated by the light emission member 17 to form a corresponding high or low voltage which is converted by the A/D converter 102 to form a corresponding digital signal sent to the MCU 13 to be compared with the encrypted coding data set 100 for decoding; and the MCU 13 controls the servomotors 14a and 14b to spin forwards, decelerate, spin backwards or stop based on decoding correctness and the detected corresponding digital signal in a condition of strong, weak, presence or absence. The autonomous moving cleaning apparatus 1 is floor sweeping machine 10.

Figure 3:
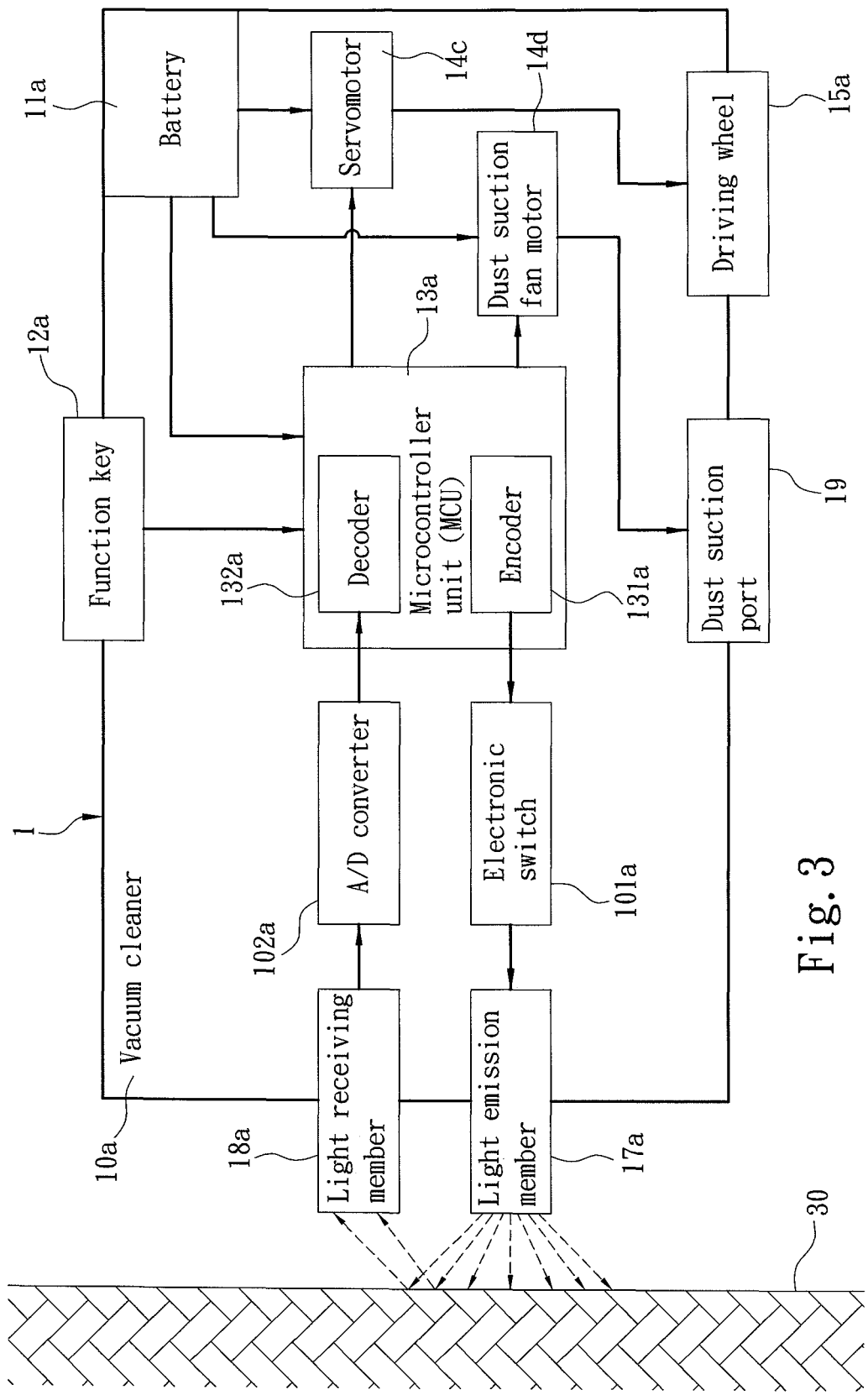
FIG. 3 is a schematic block diagram of the structure of a second embodiment of the invention.

Please refer to FIG. 3 for a second embodiment of the method according to the invention adopted for use on an autonomous moving cleaning apparatus 1. The autonomous moving cleaning apparatus 1 includes at least a battery 11a to provide operation of the cleaning apparatus 1, a driving wheel 15a to drive moving of the cleaning apparatus 1, a dust suction fan motor 14d to clear dirt on the floor, at least one servomotor 14c to drive the driving wheel 15a, a MCU 13a to control spinning of the servomotor 14c, a light emission member 17a (such as a LED tube) activated by a voltage sent by the MCU 13a and converted, a light receiving member 18a to receive light from the light emission member 17a and converted and sent to the MCU 13a for operation thereof, and a function key 12a to select preset functions provided by the MCU 13a to control the dust suction fan motor 14d and the servomotor 14c. The MCU 13a further includes an encoder 131a to form an encrypted encoding data set 100 and a decoder 132a to compare with the encrypted encoding data set 100 for decoding. The autonomous moving cleaning apparatus 1 also can include an electronic switch 101a (such as a triode or MOS tube) controlled by the data values in the encrypted encoding data set 100 and an analog-to-digital (A/D) converter 102a to convert the voltage corresponding to the light received by the light receiving member 18a to the corresponding digital signal. The method according to the invention includes the steps of: the MCU 13a provides a digital signal which is processed through an encoding technique, such as Manchester encoding technique, to form an encrypted encoding data set 100; the MCU 13 continuously sends out the encrypted encoding data set 100; the data values in the encrypted encoding data set 100 are converted to high or low voltages via the electronic switch 101a to activate the light emission member 17a to generate flicker light; the light receiving member 18a continuously receives a string of reflective light from an obstacle 30 corresponding to the flicker light generated by the light emission member 17a to form a corresponding high or low voltage which is converted by the A/D converter 102a to form a corresponding digital signal sent to the MCU 13a to be compared with the encrypted coding data set 100 for decoding; and the MCU 13a controls the servomotor 14c to spin forwards, decelerate, spin backwards or stop based on decoding correctness and the detected corresponding digital signal in a condition of strong, weak, presence or absence. The autonomous moving cleaning apparatus 1 is a vacuum cleaner 10a with a dust suction port 19 at a lower side thereof communicating with the dust suction fan motor 14d.

Figure 4:
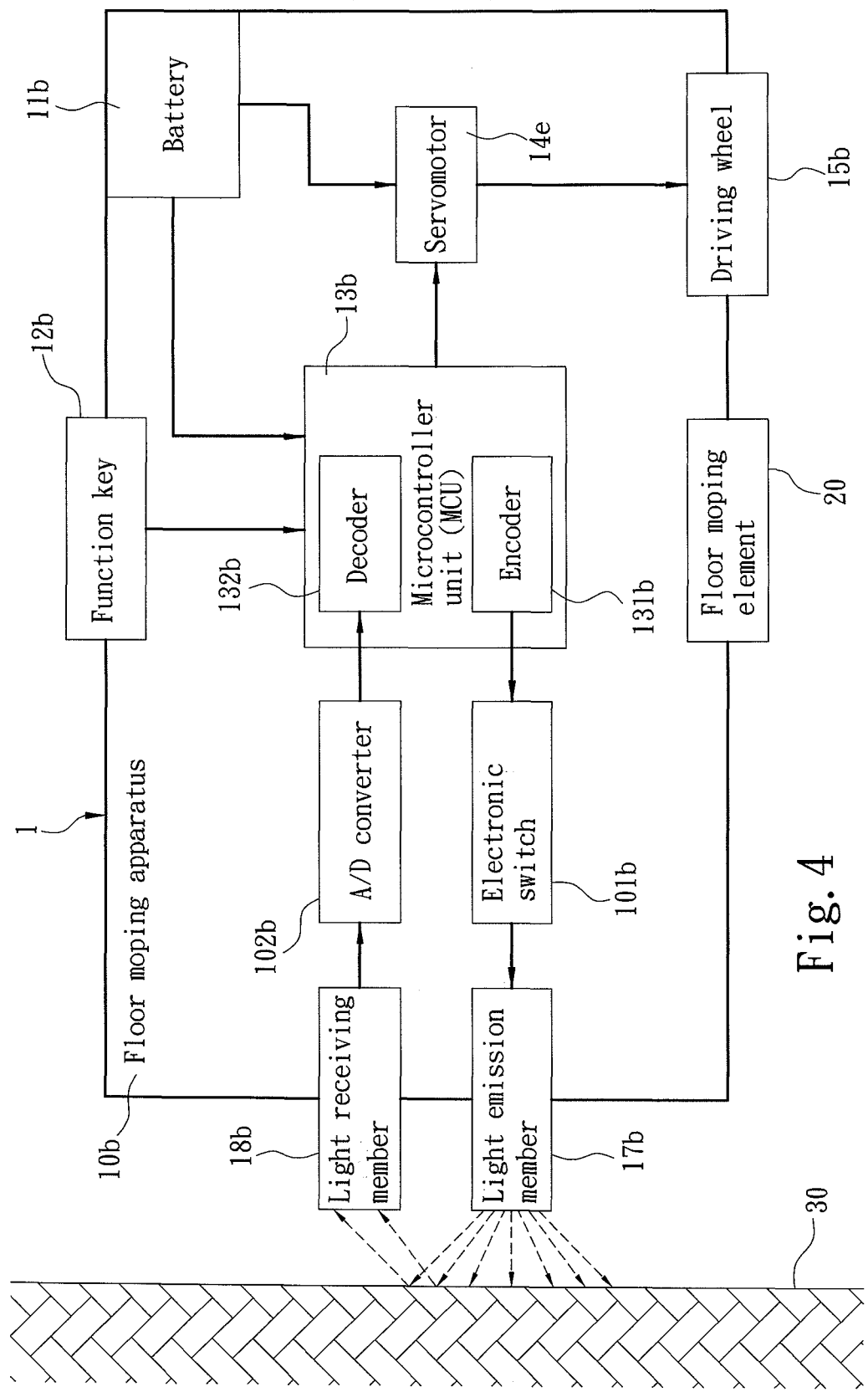
FIG. 4 is a schematic block diagram of the structure of a third embodiment of the invention.

Please refer to FIG. 4 for a third embodiment of the method according to the invention adopted for use on an autonomous moving cleaning apparatus 1. The autonomous moving cleaning apparatus 1 includes at least a battery 11b to provide operation of the cleaning apparatus 1, a driving wheel 15b to drive moving of the cleaning apparatus 1, at least one servomotor 14e to drive the driving wheel 15b, a MCU 13b to control spinning of the servomotor 14e, a light emission member 17b (such as a LED tube) activated by a voltage sent by the MCU 13b and converted, a light receiving member 18b to receive light emitted from the light emission member 17b and converted and sent to the MCU 13b for operation thereof, and a function key 12b to select preset functions provided by the MCU 13b to control the servomotor 14e. The MCU 13 further includes an encoder 131b to form an encrypted encoding data set 100 and a decoder 132b to compare with the encrypted encoding data set 100 for decoding. The autonomous moving cleaning apparatus 1 also can include an electronic switch 101b (such as a triode or MOS tube) controlled by the data values in the encrypted encoding data set 100 and an analog-to-digital (A/D) converter 102b to convert the voltage corresponding to the light received by the light receiving member 18b to the corresponding digital signal. The method according to the invention includes the steps of: the MCU 13b provides a digital signal which is processed through an encoding technique, such as Manchester encoding technique, to form an encrypted encoding data set 100; the MCU 13 continuously sends out the encrypted encoding data set 100; the data values in the encrypted encoding data set 100 are converted to high or low voltages via the electronic switch 101*b* to activate the light emission member 17*b* to generate flicker light; the light receiving member 18*b* continuously receives a string of reflective light from an obstacle 30 corresponding to the flicker light generated by the light emission member 17*b* to form a corresponding high or low voltage which is converted by the A/D converter 102*b* to form a corresponding digital signal sent to the MCU 13*b* to be compared with the encrypted coding data set 100 for decoding; and the MCU 13*b* controls the servomotor 14*e* to spin forwards, decelerate, spin backwards or stop based on decoding correctness and the detected corresponding digital signal in a condition of strong, weak, presence or absence. The autonomous moving cleaning apparatus 1 is floor moping apparatus 10*b* with a floor moping element 20 attached to a lower side to clear dirt on the floor. The floor moping element 20 can be a flat plate with a moping cloth or paper towel attached thereon.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for operating an autonomous moving cleaning apparatus which includes at least a battery to support operation of the cleaning apparatus, a driving wheel to drive moving of the cleaning apparatus, a floor sweeping roller to clear dirt on a floor, at least one servomotor to drive the driving wheel and the floor sweeping roller, a microcontroller unit to control spinning of the servomotor, a light emission member activated by a voltage sent and converted by the microcontroller unit, a light receiving member to receive light from the light emission member and convert the light to send to operate the microcontroller unit and a function key to select preset functions provided by the microcontroller unit to control the servomotor, the method comprising the steps of:
    providing a digital signal by the microcontroller unit and processing the digital signal through an encoding technique to form an encrypted encoding data set;
    sending out continuously the encrypted encoding data set by the microcontroller unit;
    converting data values in the encrypted encoding data set to high or low voltages to activate the light emission member to generate flicker light; and
    receiving continuously a string of reflective light corresponding to the flicker light by the light receiving member to form a corresponding high or low voltage which is converted to form a corresponding digital signal sent to the microcontroller unit to be compared with the encrypted encoding data set for decoding;
    wherein the microcontroller unit controls the servomotor to spin forwards, decelerate, spin backwards or stop based on decoding correctness and the detected corresponding digital signal in a condition of strong, weak, presence or absence.

2. The method of claim 1, wherein the encrypted encoding data set is formed through Manchester encoding technique.

3. The method of claim 1, wherein the microcontroller unit further includes an encoder to form the encrypted encoding data set and a decoder to compare with the encrypted encoding data set for decoding.

4. The method of claim 2, wherein the microcontroller unit further includes an encoder to form the encrypted encoding data set and a decoder to compare with the encrypted encoding data set for decoding.

5. The method of claim 2, wherein the autonomous moving cleaning apparatus further includes an electronic switch controlled by the data values in the encrypted encoding data set and an analog-to-digital converter to convert the voltage corresponding to the light received by the light receiving member to the corresponding digital signal.

6. The method of claim 4, wherein the autonomous moving cleaning apparatus further includes an electronic switch controlled by the data values in the encrypted encoding data set and an analog-to-digital converter to convert the voltage corresponding to the light received by the light receiving member to the corresponding digital signal.

7. The method of claim 1, wherein the autonomous moving cleaning apparatus is a floor sweeping machine.

8. A method for operating an autonomous moving cleaning apparatus which includes at least a battery to support operation of the cleaning apparatus, a driving wheel to drive moving of the cleaning apparatus, a dust suction fan motor to clear dirt on a floor, at least one servomotor to drive the driving wheel, a microcontroller unit to control spinning of the servomotor, a light emission member activated by a voltage sent and converted by the microcontroller unit, a light receiving member to receive light from the light emission member and convert the light to send to operate the microcontroller unit and a function key to select preset functions provided by the microcontroller unit to control the servomotor, the method comprising the steps of:
    providing a digital signal by the microcontroller unit and processing the digital signal through an encoding technique to form an encrypted encoding data set;
    sending out continuously the encrypted encoding data set by the microcontroller unit;
    converting data values in the encrypted encoding data set to high or low voltages to activate the light emission member to generate flicker light; and
    receiving continuously a string of reflective light corresponding to the flicker light by the light receiving member to form a corresponding high or low voltage which is converted to form a corresponding digital signal sent to the microcontroller unit to be compared with the encrypted encoding data set for decoding;
    wherein the microcontroller unit controls the servomotor to spin forwards, decelerate, spin backwards or stop based on decoding correctness and the detected corresponding digital signal in a condition of strong, weak, presence or absence.

9. The method of claim 8, wherein the encrypted encoding data set is formed through Manchester encoding technique.

10. The method of claim 8, wherein the microcontroller unit further includes an encoder to form the encrypted encoding data set and a decoder to compare with the encrypted encoding data set for decoding.

11. The method of claim 9, wherein the microcontroller unit further includes an encoder to form the encrypted encoding data set and a decoder to compare with the encrypted encoding data set for decoding.

12. The method of claim 9, wherein the autonomous moving cleaning apparatus further includes an electronic switch controlled by the data values in the encrypted encoding data set and an analog-to-digital converter to convert the voltage corresponding to the light received by the light receiving member to the corresponding digital signal.

13. The method of claim 11, wherein the autonomous moving cleaning apparatus further includes an electronic switch controlled by the data values in the encrypted encoding data set and an analog-to-digital converter to convert the voltage corresponding to the light received by the light receiving member to the corresponding digital signal.

14. The method of claim 8, wherein the autonomous moving cleaning apparatus is a vacuum cleaner which includes a dust suction port at a lower side thereof communicating with the dust suction fan motor.

15. A method for operating an autonomous moving cleaning apparatus which includes at least a battery to support operation of the cleaning apparatus, a driving wheel to drive moving of the cleaning apparatus, at least one servomotor to drive the driving wheel, a microcontroller unit to control spinning of the servomotor, a light emission member activated by a voltage sent and converted by the microcontroller unit, a light receiving member to receive light from the light emission member and convert the light to send to operate the microcontroller unit and a function key to select preset functions provided by the microcontroller unit to control the servomotor, the method comprising the steps of:

providing a digital signal by the microcontroller unit and processing the digital signal through an encoding technique to form an encrypted encoding data set;

sending out continuously the encrypted encoding data set by the microcontroller unit;

converting data values in the encrypted encoding data set to high or low voltages to activate the light emission member to generate flicker light; and receiving continuously a string of reflective light corresponding to the flicker light by the light receiving member to form a corresponding high or low voltage which is converted to form a corresponding digital signal sent to the microcontroller unit to be compared with the encrypted encoding data set for decoding;

wherein the microcontroller unit controls the servomotor to spin forwards, decelerate, spin backwards or stop based on decoding correctness and the detected corresponding digital signal in a condition of strong, weak, presence or absence.

16. The method of claim 15, wherein the encrypted encoding data set is formed through Manchester encoding technique.

17. The method of claim 15, wherein the microcontroller unit further includes an encoder to form the encrypted encoding data set and a decoder to compare with the encrypted encoding data set for decoding.

18. The method of claim 16, wherein the microcontroller unit further includes an encoder to form the encrypted encoding data set and a decoder to compare with the encrypted encoding data set for decoding.

19. The method of claim 16, wherein the autonomous moving cleaning apparatus further includes an electronic switch controlled by the data values in the encrypted encoding data set and an analog-to-digital converter to convert the voltage corresponding to the light received by the light receiving member to the corresponding digital signal.

20. The method of claim 18, wherein the autonomous moving cleaning apparatus further includes an electronic switch controlled by the data values in the encrypted encoding data set and an analog-to-digital converter to convert the voltage corresponding to the light received by the light receiving member to the corresponding digital signal.

21. The method of claim 15, wherein the autonomous moving cleaning apparatus is a floor moping apparatus which includes a lower side attached to a floor moping element to clear dirt on a floor.

* * * * *